United States Patent [11] 3,631,561

[72] Inventor Marvin Aszkenas
 1206 Riverbank Drive, Stamford, Conn. 06905
[21] Appl. No. 886,113
[22] Filed Dec. 18, 1969
[45] Patented Jan. 4, 1972

[54] SNAP-ON CLEANING UNIT FOR VEHICULAR WINDSHIELD WIPERS
 5 Claims, 4 Drawing Figs.
[52] U.S. Cl. .................................................. 15/250.41, 15/117
[51] Int. Cl. .......................................................... B60s 1/04
[50] Field of Search ............................................ 15/250.41, 250.4, 105, 117, 250.36, 250.42

[56] References Cited
 UNITED STATES PATENTS
 1,846,885  2/1932  Manuel ................... 15/250.41 X
 1,953,703  4/1934  Dirienzo .................. 15/250.4
 2,253,249  8/1941  Peterson .................. 15/250.4
 2,663,889  12/1953 Fuglie ..................... 15/250.41 X
 3,417,421  12/1968 Retke ...................... 15/250.41
 FOREIGN PATENTS
 489,352  10/1936  Great Britain ............. 15/250.4

Primary Examiner—Peter Feldman
Attorney—Alfred E. Miller

ABSTRACT: A cleaning unit adapted to be held in place by any standard type of automobile windshield wiper blade. The unit has an elongated opening through which the wiper blade projects. The cleaning unit may be solely a snap-on ice scraper or a snap-on sponge and squeegee combination for cleaning wet windshields. The device is of a clear plastic and is bendable to conform to the windshield curvature.

PATENTED JAN 4 1972 3,631,561

INVENTOR
MARVIN ASZKENAS
BY *Alfred E. Miller*
ATTORNEY

SNAP-ON CLEANING UNIT FOR VEHICULAR WINDSHIELD WIPERS

BACKGROUND OF THE INVENTION

It is common knowledge that windshield wipers of present-day vehicles are useful only for wiping water from the windshield, but are not effective in cleaning the windshield and scraping ice from the same. Many types of removal means have been employed for removing ice from a windshield, such as chemical ice solvents and windshield scrapers, however, these means must be applied manually and the vehicle must be halted in order to remove the ice accumulated on the windshield. Moreover, this process must be continually repeated causing a great deal of inconvenience.

It is an object of the present invention to provide a vehicle windshield cleaning means that is adapted to snap on any standard vehicle windshield wiper blade and which is effective to continually remove ice forming on the windshield, or to continually clean a windshield spattered with mud and other debris.

Another object of the present invention is to provide a windshield scraper attachment which is transparent and therefore not obstructive to the view through the windshield.

A further object of the present invention is to provide a cleaning unit that snaps on a windshield wiper blade and is effective to clean any foreign matter from the windshield, and operates in conjunction with an operative wiper blade.

An object of the present invention is to provide a windshield ice scraper or cleaner that is relatively inexpensive to manufacture, easy to install on existing windshield wiper blades, and is reliably effective for the purposes intended.

The invention will now be more fully described in accordance with the accompanying drawings in which.

DESCRIPTION OF THE PREFERRED EMBODIMENTS

The present invention relates to cleaning unit attachment referred to generally by the numeral 10 which is adapted to snap-on to a windshield wiper assembly having a wiper arm 12 and a wiper blade 14. It should be noted that the windshield wiper assembly is of conventional design presently being used on vehicular windshields and forms no part, per se, of the present invention. The windshield wiper assembly is spring-biased (not shown), in order to ensure firm but resilient engagement of the wiper blade on the windshield.

Figure 1:
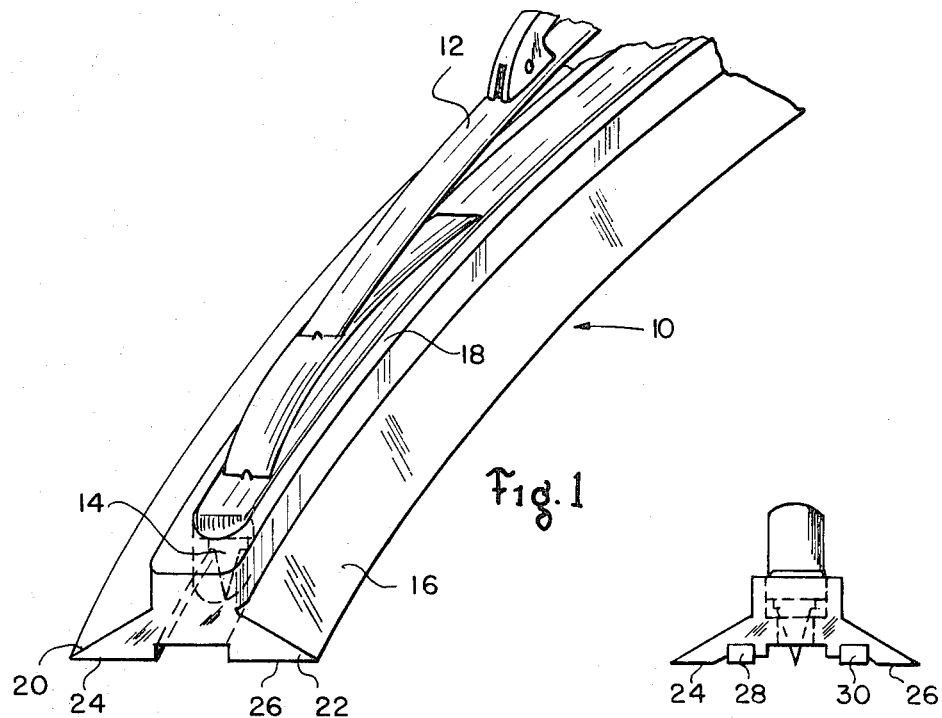
FIG. 1 is a partial perspective view of the snap-on cleaning unit attachment for vehicular windshield wiper blades constructed in accordance with the teachings of the present invention.

In FIG. 1, the cleaning unit 10 takes the form of an ice scraper constituted of a clear, bendable plastic, elongated member 16 provided with an elongated longitudinal opening 18. The ice scraper is further provided with laterally disposed scraping edges 20 and 22 that form an acute angle with the surface of the windshield. The surfaces 24 and 26 of the scraping edges are adapted to lie flat on the windshield outer surfaces with the points of the scraping edges 20 and 22 scraping all the ice accumulating on the windshield. As clearly seen in FIG. 2, the blade 14 projects through the elongated opening 18 in the cleaning unit 10 and since the windshield wiper assembly is spring-biased the cleaning unit attachment is firmly held in place by said assembly. In addition, since the cleaning unit 10 is fabricated of transparent plastic there is no obstruction to the visibility of the driver.

Figure 2:
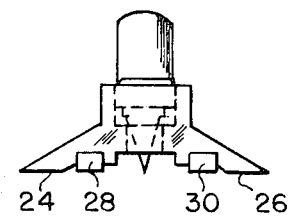
FIG. 2 is a sectional view of alternate embodiment of the snap-on cleaning unit attachment for windshield wiper blades as shown in FIG. 1.

FIG. 2 illustrates a construction similar to the structure shown in FIG. 1, however, sponges 28 and 30 are embedded in the cleaning unit 10 and are located on either side of the blade 14. The sponges 28 and 30 serve to more effectively clear the windshield of the remaining water after the scraping edges 20 and 22 have removed the ice from the windshield.

Figure 3:
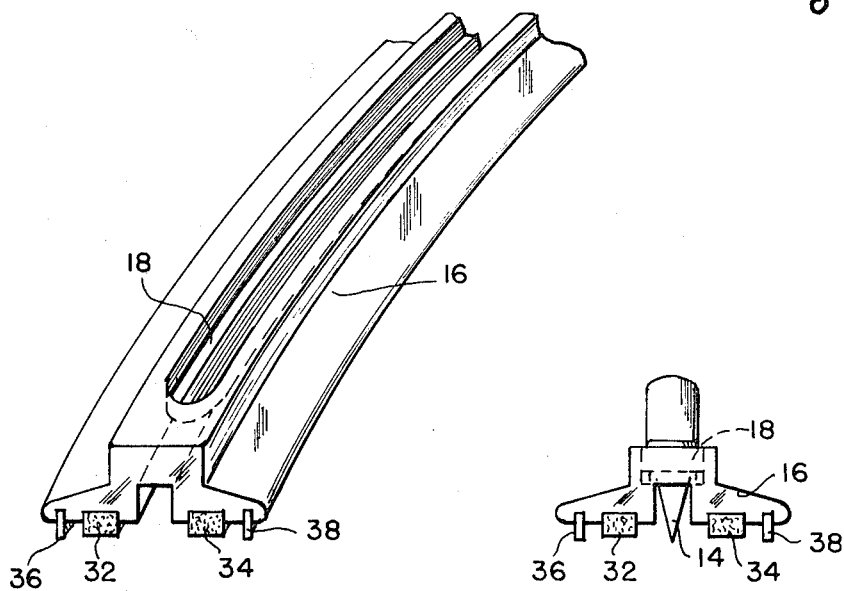
FIG. 3 is a perspective view of another embodiment of the present invention with the windshield wiper arm and blade removed for purposes of clarity.
Figure 4:
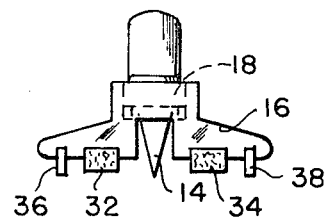
FIG. 4 is a sectional view of the structure shown in FIG. 3.

FIGS. 3 and 4 illustrate an alternate embodiment of the present invention in which a cleaning unit is shown for use with a windshield wiper blade. The elongated member 16 is provided with sponges 32 and 34 as well as squeegee elements 36 and 38. Thus, the unit shown herein is effective for cleaning windshields which are spattered with mud and debris, inasmuch as the wiper blade itself cannot accomplish this by itself.

What is claimed is:

1. A snap-on cleaning unit of unitary structure for a spring-biased vehicle windshield wiper blade assembly including a blade holder comprising an elongated, bendable, transparent plastic cleaning element with cleaning surface and having an elongated opening extending therethrough corresponding approximately in length and width to the length and width of said windshield wiper blade holder, said windshield wiper blade holder being adapted to frictionally fit in said elongated opening of the cleaning element with the cleaning surfaces of the latter located on said windshield adjacent to but laterally displaced from the location of said wiper blade on the windshield, said friction fit of the cleaning element on said wiper blade holder being the sole retainer for said cleaning element.

2. A snap-on cleaning unit for a vehicle windshield as claimed in claim 1 wherein said cleaning surfaces are relative sharp edges forming ice and snow scrapers.

3. A snap-on cleaning unit for a vehicle windshield wiper as claimed in claim 2 wherein said cleaning element is disposed at an acute angle to said windshield with said sharp edges sliding along outer surfaces of said windshield.

4. A snap-on cleaning unit for a spring-biased vehicle windshield wiper blade assembly including a blade holder comprising an elongated, bendable, cleaning element with cleaning surfaces and having an elongated opening therein corresponding approximately in length to the length of said windshield wiper blade, said windshield wiper blade holder being adapted to frictionally fit in said elongated opening of the cleaning element with the cleaning surfaces of the latter being located on said windshield adjacent to but laterally displaced from the location of said wiper blade on the windshield, and said bendable cleaning element being provided with a sponge member and a rubber squeegee edge portion.

5. A snap-on cleaning unit for a vehicle windshield wiper as claimed in claim 1 wherein said cleaning element is provided with a sponge member and angular ice-scraper edges located on both sides of said windshield wiper blade.

* * * * *